United States Patent [19]

Wilson

[11] Patent Number: 5,760,296
[45] Date of Patent: Jun. 2, 1998

[54] COOLING SYSTEM PRESSURE TESTING FOR LEAK DETECTION

[75] Inventor: Mark Stephen Wilson, Auchenflower, Australia

[73] Assignee: ABW Australia Pty. Ltd., Australia

[21] Appl. No.: 740,035

[22] Filed: Oct. 23, 1996

[30] Foreign Application Priority Data

Oct. 23, 1995 [AU] Australia ................... PN6163

[51] Int. Cl.⁶ .................. G01M 3/04; G01M 3/32
[52] U.S. Cl. .............. 73/49.7; 604/96; 73/49.8; 73/756
[58] Field of Search .......... 73/40.5 R, 49.2 T, 73/49.2 R, 49.8, 49.3, 756; 604/96

[56] References Cited

U.S. PATENT DOCUMENTS

| | | | |
|---|---|---|---|
| 2,457,244 | 12/1948 | Lamson | 604/96 |
| 5,105,653 | 4/1992 | Konter | 73/49.2 R |
| 5,557,966 | 9/1996 | Corry | 73/756 X |

FOREIGN PATENT DOCUMENTS

| | | |
|---|---|---|
| 1332115 | 10/1973 | United Kingdom. |
| 2279758 | 1/1995 | United Kingdom. |

*Primary Examiner*—Richard Chilcot
*Assistant Examiner*—Joseph L. Felber

[57] ABSTRACT

A pressure testing device for attachment to an inlet opening of an object to be pressure tested. The device has a sealing head with a bladder. An inlet to the bladder allows it to be inflated and a passage extends through the bladder for pressurising the object. An adjustable coupling is mounted to the stem for attaching the device to the inlet opening and an adjustable guard is mounted to the stem and is movable into engagement against the inlet opening.

14 Claims, 7 Drawing Sheets

5,760,296

COOLING SYSTEM PRESSURE TESTING FOR LEAK DETECTION

THIS INVENTION relates to an improved pressure testing device. In particular, the invention concerns a pressure testing device for pressure testing of tanks, containers, cooling systems and for other pressure testing applications.

U.S. patent application Ser. No. 5,557,966 discloses a device having a sealing head positionable in an opening of a vessel or container to be pressure tested. The head has a bladder with an inlet allowing the bladder to be inflated and a passage through the bladder for pressurising the vessel to conduct a test. In use, the bladder was inflated to close off the opening into the vessel so that air introduced into the vessel through the passage would pressurise the vessel.

With this earlier device, inflation of the bladder caused the device to tilt freely relative to the opening in the vessel until the bladder became firmly wedged into the opening of the vessel. This movement was undesirable and made the pressure testing operation more difficult to carry out.

With this earlier device, there was a danger, when the device was used to pressure test vehicle cooling systems, of hot liquid being expelled from the opening of the cooling system. This would sometimes occur at the completion of a test when the pressure within the bladder was released to deflate the bladder. Ejection of hot liquids would also occur in the event of rupturing of the bladder.

Inadvertent ejection or escape of hot liquids from a cooling system being tested could lead to injury and was undesirable.

SUMMARY OF THE INVENTION

It is an object of the invention to provide a pressure testing device which at least minimizes the disadvantages referred to above.

According to an aspect of the invention, there is provided a pressure testing device for attachment in an inlet opening of an object to be pressure tested, the device including a stem with a sealing head, the head having a bladder with an inlet, a passage extending through the bladder and having an inlet for coupling to a source of fluid pressure and an outlet, a coupling on the stem for attaching the device to the inlet opening, the coupling being adjustably mounted to the stem, and a guard adjustably mounted to the stem and movable into engagement against the inlet opening to abut against it.

The coupling may be adjustably mounted to the stem in any suitable manner. The adjustability allows the coupling to be moved along the stem and located at any desired position along it. In one embodiment, the coupling is screw threaded and the stem is correspondingly threaded. The coupling may have a threaded aperture through which the stem may project.

The coupling has attachment portions allowing it to be secured to the inlet opening. In one embodiment, the attachment portions comprise two retaining clips. Preferably, the clips are biased into engagement with the inlet opening. Spring bias is preferred.

The guard may be adjustably mounted to the stem in any suitable way. For example, the guard may have an aperture through which the stem may extend. In this way, the guard may be moved along the stem. Preferably, the aperture through the guard is screw threaded and engages a corresponding thread on the stem.

If desired, the guard may be integrally formed with the coupling although it is preferred that the guard be provided as a component separate from the coupling.

The guard may include a seal adapted to engage with and seal against the inlet opening. The guard may have a splash deflecting flange. Preferably, the flange is directed outwardly of the guard and extends a short distance along a neck of the object being pressure tested with the inlet opening being provided by the neck.

BRIEF DESCRIPTION OF THE DRAWINGS

A particular preferred embodiment of the invention will now be described by way of example with reference to the drawings in which.

DETAILED DESCRIPTION OF THE PREFERRED EMBODIMENTS

Figure 1:
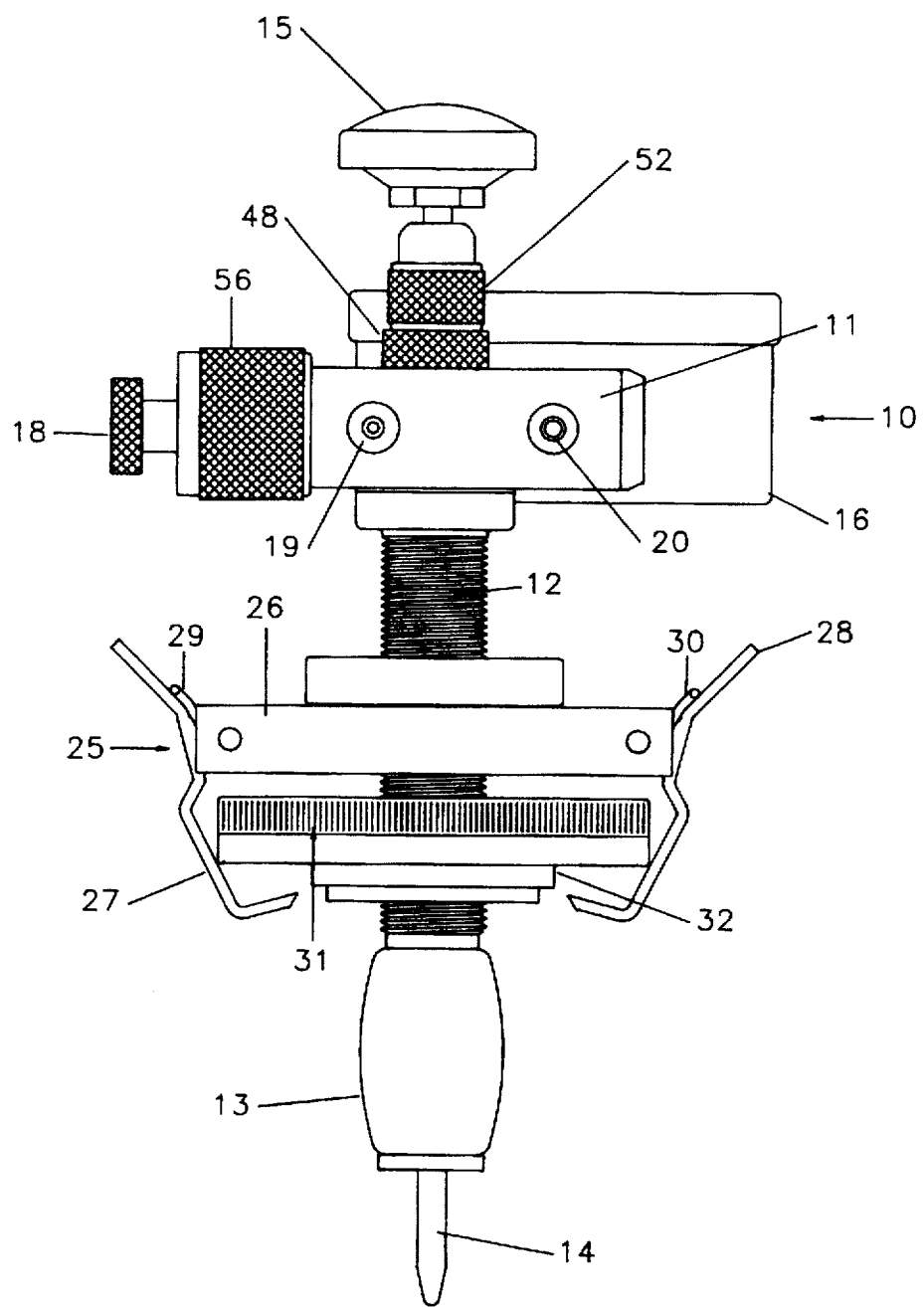
FIG. 1 is an elevational view of a pressure testing device according to one embodiment of the invention.

FIG. 1 shows a pressure testing device 10 having a valve body 11 and a stem 12 projecting from the underside of the body 11. A bladder 13 is secured to one end of the stem 12 and a passage extends through the bladder 13. The passage is hollow and allows air under pressure to be directed into a container being pressure tested by the device 10.

A temperature probe 15 is mounted to the upper side of the body and has a sensor end 14 which projects into and from the passage and allows the temperature of fluid within the container being tested to be determined during a test.

A pressure gauge 16 is mounted to a side of the body 11 and provides an indication of the pressure to which the container under test is pressurised.

The body 11 has a valve 40 (see FIG. 2) within it. The function of the valve is described below. A drain outlet 19 is present on one side of the body 11. A drain hose (not shown) is normally coupled to the outlet 19. Inlet 20 allows a source of pressurised air to be coupled to the body 11. A hose (not shown) extends between the inlet 20 and the source of pressurised air.

Coupling 25 is screw threaded onto the stem 12 so that its location along the length of the stem may be varied. The coupling has a support plate 26 in screw threaded engagement with the stem 12 and two opposed retaining clips 27, 28. The clips 27, 28 are biased into the position shown by springs 29, 30. Guard 31 is mounted for screw threaded engagement with the stem 12 and consists of a first part 32 with serrations and a second part 33 (see FIG. 2) carried by part 32. Part 32 engages against an opening to a container or vessel which may be pressure tested by the device 10.

Figure 2:
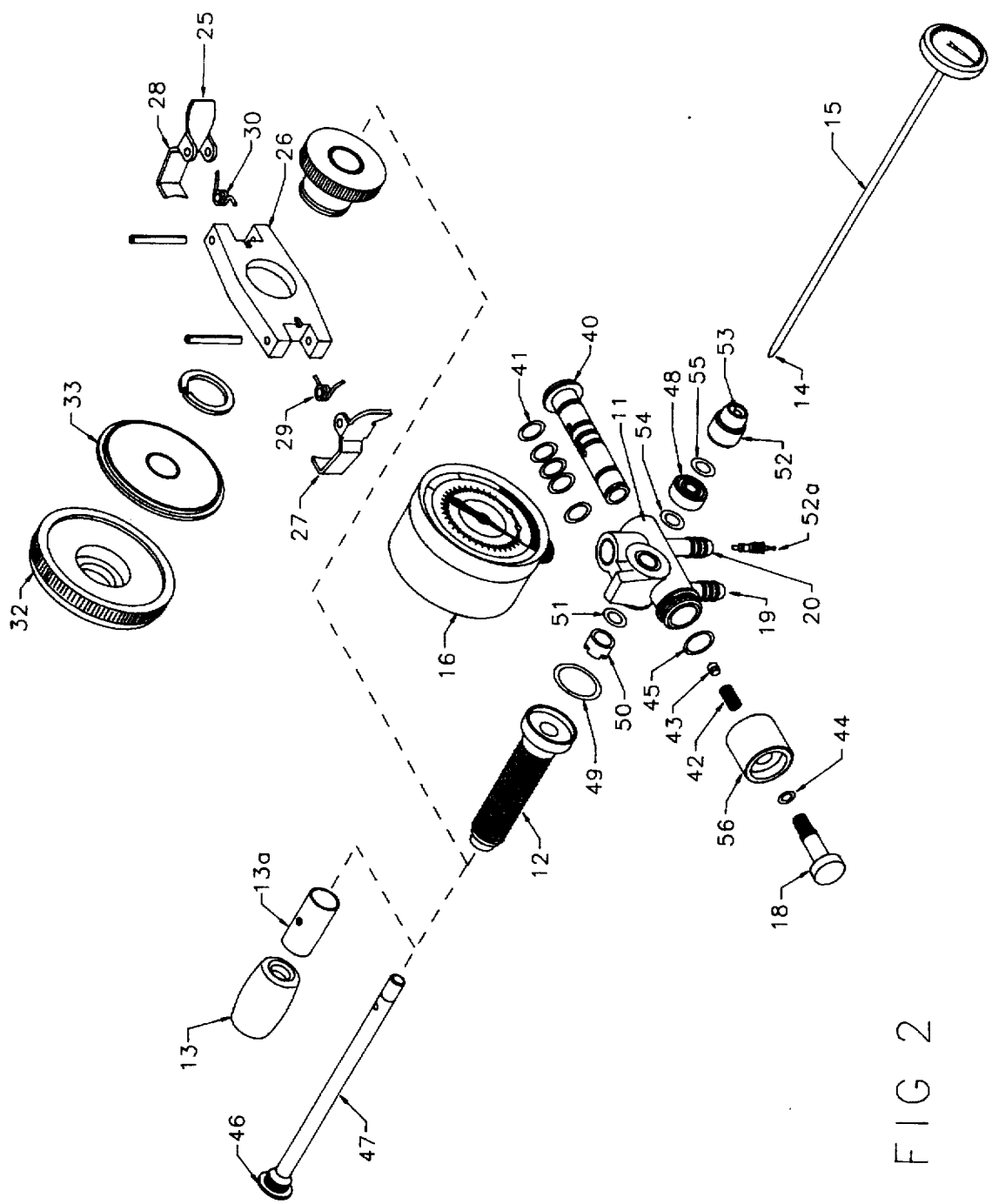
FIG. 2 is an exploded view of the device of FIG. 1.

FIG. 2 shows an exploded view of the device 10 of FIG. 1.

The body 11 has a relief valve adjusting screw 18 which projects into the body 11 from one side and a slide valve 40 which projects into the body from the other side. The screw has a threaded end which is screw threaded into an end of the slide valve 40 so that it moves with the valve 40.

The slide valve 40 carries seals 41 which are received in grooves on the valve. The valve 40 has radial bores shown which communicate with the hollow interior of the valve 40. The interior of valve 40 receives spring 42 needle valve 43 and seal 44 which abuts against screw 18. Circlip 45 is received by an end of the valve 40 in a groove on that end and ensures that the valve may not be withdrawn from the body.

Flange member 46 is mounted to an end of tube 47 and the opposite end of the tube 47 receives locking nut 48.

Tube 47 extends through stem 12 and clearance exists between them.

Stem 12 receives seal 49, collet 50 and seal 51 locates against one end of the collet.

Valve 52a is screwed into inlet 20.

The thermometer 15 extends through the body 11, through the stem 12 and the tube 47 and extends from the distal end of the tube 47. The thermometer receives mounting nut 52 and seal 53. Seals 54 and 55 are located on opposite sides of nut 48.

Slide valve closing nut 56 is screw threaded onto the body 11 and has a recessed outer face which may conceal the head of screw 18.

Figure 3:
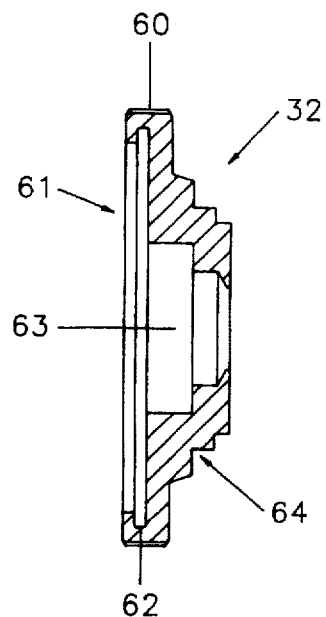
FIG. 3 is a transverse sectional view of sealing shield which forms part of the guard of the device of an embodiment of the invention.

FIG. 3 shows part 32 of the guard 31. Knurled ring 60 extends around part 32. Recess 61 has an undercut groove 62 which together receive part 33 shown in FIG. 4. Part 32 has a stepped bore 63 extending through it and an outer stepped periphery 64.

Figure 4:
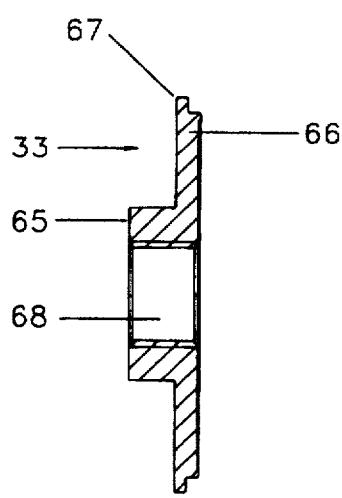
FIG. 4 is a transverse sectional view of a seal which forms a further part of the guard of FIG. 3.

FIG. 4 shows part 33 of the guard 31. Part 33 has a boss 65 which is received within the stepped bore 63 of part 32 and a flange 66. Flange 66 terminates in a reduced width portion 67 which locates within groove 62 of part 32. A bore 68 extends through part 33.

Figure 5:
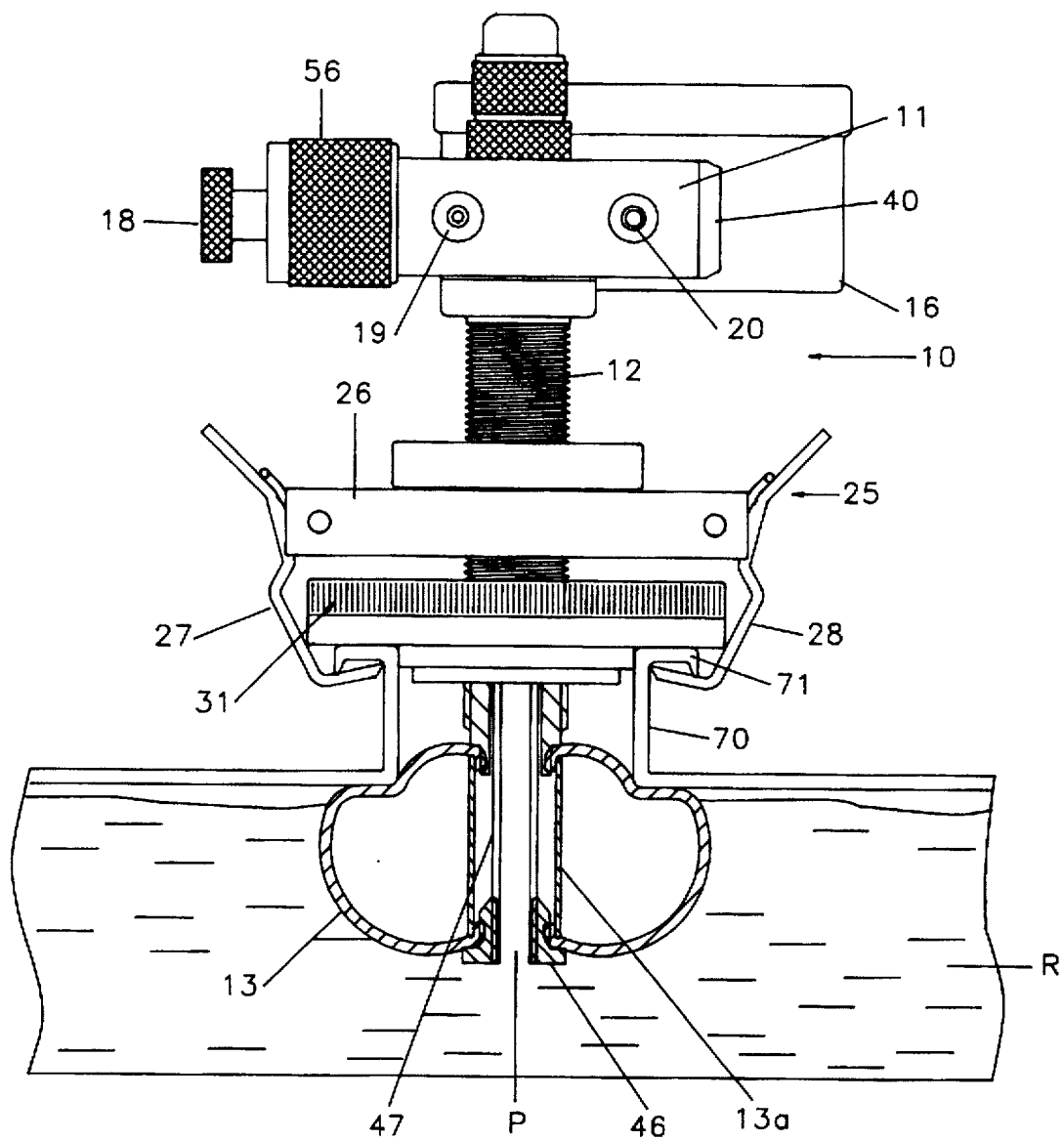
FIG. 5 is an elevational view of the pressure testing device shown fitted to an inlet opening of an object being pressure tested.

FIG. 5 shows the device 10 mounted to an inlet 70 of an object being pressure tested. In this view, the object is a radiator R for an engine cooling system. The inlet 70 has a flanged neck 71.

The device 10 is fitted to the inlet 70 whilst the bladder is deflated. The bladder is inserted into the inlet 70 and guard 31 screwed down against neck 71. Coupling 26 is screw threaded along the stem 12 to the desired position and the clips 27 and 28 are operated to engage on the underside of an outside surface of the neck 71. With the side valve 40 pulled to the extreme right hand position to the extent limited by circlip 45 in FIG. 2, the head of the screw 18 is withdrawn into the recessed face of slide valve closing nut 56. When the valve 40 is in this position, air introduced into the inlet 20 causes the bladder 13 to inflate to wedge it into the inlet 70 as shown in the figure. Slide valve 40 is then slid into the position shown in this figure and the head of the screw 18 is then exposed. Continued introduction of air into the inlet 20 then pressurises the radiator R but only to a pressure determined by valve needle 43. If this pressure is exceeded excess pressure is vented through drain outlet 19. The gauge 16 indicates the pressure to which the radiator is tested. At the completion of the test, screw 18 may then be screwed out to vent the radiator pressure through drain outlet. In either case, venting of the radiator R occurs first through outlet 19 and then the bladder 13 is caused to deflate. This sequence is controlled by movement of the slide valve.

The coupling 25 ensures that the device is securely held relative to the neck 71. Coupling 25 securely holds the device 10 in place even if the inflated bladder inadvertently fails to correctly locate in the neck 71.

The bladder 13 functions to seal the device relative to inlets of varying size without the need for special adaptors matched to the size of a variety of inlet diameters.

Figure 6:
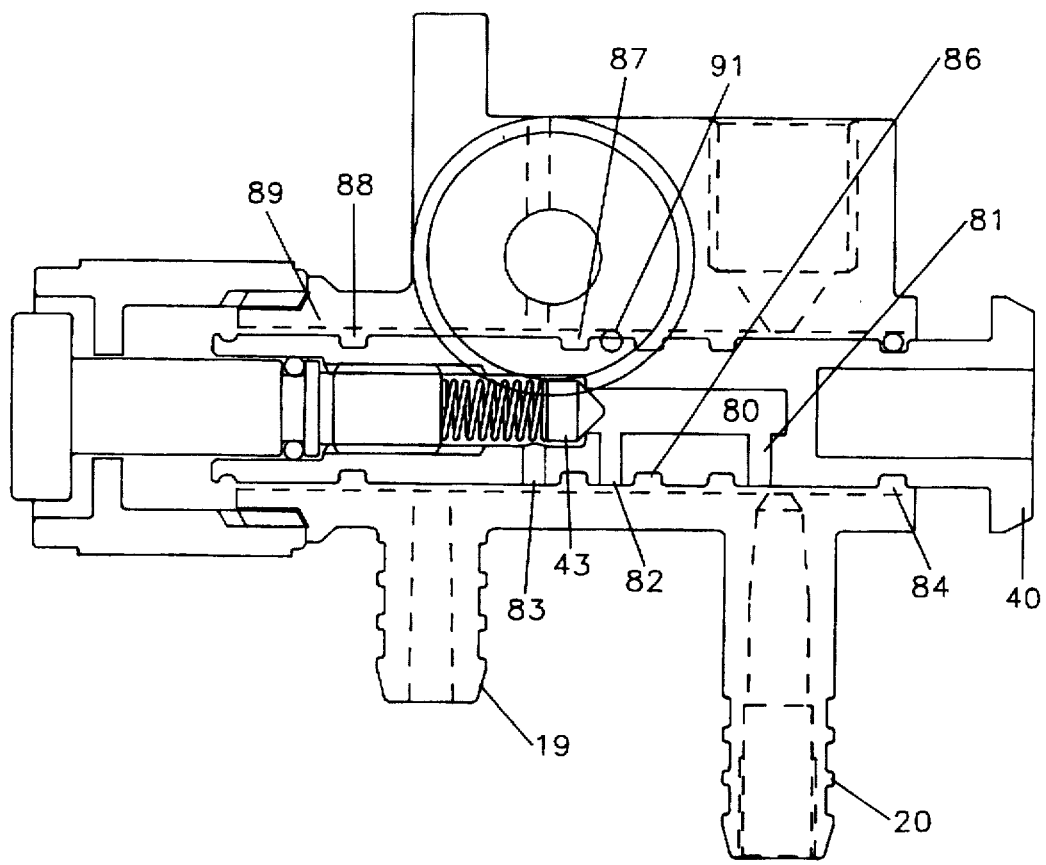
FIG. 6 is a view useful in understanding the operation of the device.
Figure 7:
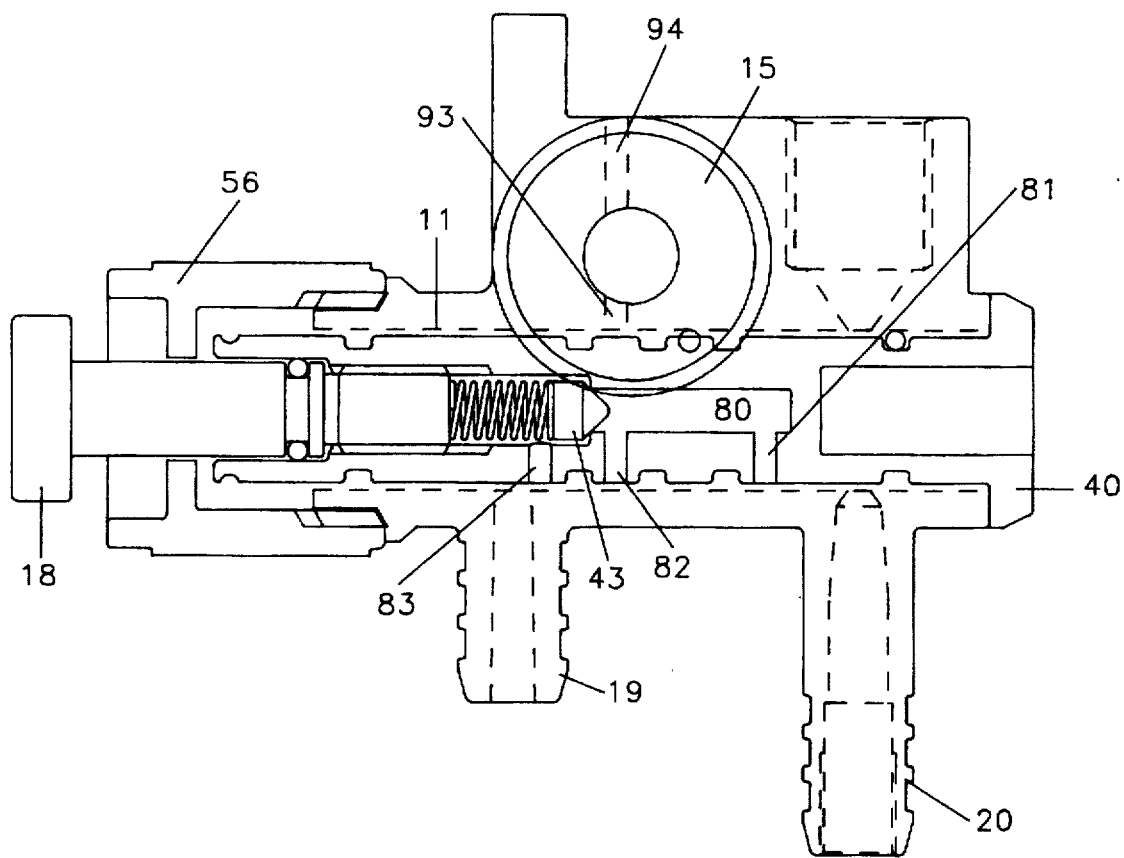
FIG. 7 is a further view useful in understanding the operation of the device.
Figure 8:
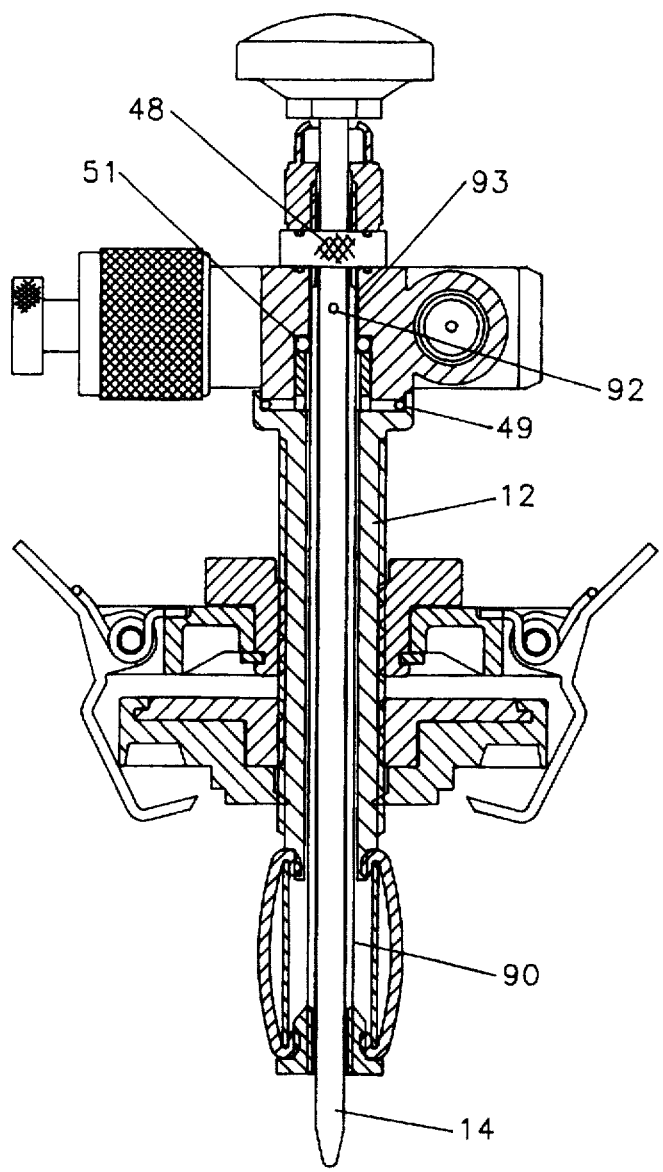
FIG. 8 is a vertical sectional view of the device of FIG. 1.

With reference to FIGS. 6 to 8, the operation of the device will be apparent. FIG. 6 shows the valve 40 in the position it assumes when the bladder is inflated. The valve 40 has a bore 80 with radial passages 81, 82, 83 located adjacent grooves 84, 85, 86, 87, 88 for receiving seals 41. Clearance exists between the valve 40 and bore 89 in the body which receives it. The stem 12 has a tube 90 within it and clearance exists between tube 90 and the interior of the stem 12. The annular seat of the body 11 which rests upon seal 51 has a port 91 extending into it and this port 91 is able to communicate with the space between valve 40 and bore 89. As shown in FIG. 2, the collet 50 is castellated at one end.

In the FIG. 6 position air introduced into inlet 20 passes through passage 81 into bore 80, through passage 82 and into port 91. This air passes through the castallations in collet 50 and into the clearance space between tube 90 and the stem and through aperture 13a in the bladder support to inflate the bladder.

The valve 40 is placed into the FIG. 7 position to pressure test an object to which the device is fitted. The tube 90 has a radial bore 92. The body 11 has a bore which provides for communication between the space between bore 93 and the tube 90 in the region between nut 48 and seal 51 (see FIG. 8). Thus, air introduced into inlet 20 passes through passage 81 into bore 80, through passage 82 into bore 93, through bore 92 and into the tube 90 in the space between the thermometer and the tube to pressurise the object under test. The bladder is isolated and remains inflated.

By screwing screw 18 to the left of FIG. 7, valve 43 is operative to vent pressure in the object through bore 80, passage 83 and through outlet 19.

Once the source of air is removed from inlet 20, the bladder is deflated by operation of screw 18.

I claim:

1. A pressure testing device for attachment to an inlet opening of an object to be pressure tested, said inlet opening having a neck which has an outside surface, the device including a stem with a sealing head, the head having a bladder with a bladder inlet, a passage extending through the bladder and having a passage inlet for coupling to a source of fluid pressure and a passage outlet, a coupling on the stem having an attachment for releasable securing of the device to the outside surface of the neck of the inlet opening, the coupling being adjustably mounted to the stem, and a guard adjustably mounted to the stem and movable into engagement against the inlet opening to abut against it.

2. The device of claim 1 wherein the stem is screw threaded and both the coupling and the guard are adapted for screw threaded engagement with the stem.

3. The device of claim 2 wherein the coupling has opposed clips for engagement with the inlet opening.

4. The device of claim 1 wherein the coupling has opposed clips for engagement with the inlet opening.

5. The device of claim 4 wherein the clips are spring biased into engagement with the inlet opening and movable out of engagement with the opening by movement against the spring bias.

6. The device of claim 5 including a support plate to which the clips are pivotally mounted on opposed sides thereof.

7. The device of claim 4 including a support plate to which the clips are pivotally mounted on opposed sides thereof.

8. The device of claim 1 wherein the guard comprises two circular parts fitted to one another.

9. The device of claim 8 wherein one of the parts of the guard has a stepped outer periphery for engagement with the inlet opening.

10. The device of claim 1 including a body from which the stem extends.

11. The device of claim 10 wherein the body has a body inlet into which air may be introduced, a body outlet for venting excess pressure from the object being tested and a valve for selectively allowing air supplied to the body inlet to be directed either to the bladder to inflate the bladder or to the passage to pressurize the object being tested.

12. The device of claim 11 including a relief valve within the body for limiting the pressure to which the object being tested may be subjected and for venting any excess pressure to the outlet.

13. The device of claim 12 including a pressure gauge coupled to the body and in communication with the passage.

14. The device of claim 13 including a thermometer probe adapted for attachment to the body to extend through the stem and the passage and into the object being tested.

* * * * *